United States Patent [19]

Price

[11] Patent Number: 4,986,588
[45] Date of Patent: Jan. 22, 1991

[54] WEED PULLER WITH PLUG EJECTING MEANS

[76] Inventor: Chester Price, 300 Chelsea St., P.O. Box 279, Forked River, N.J. 08731

[21] Appl. No.: 407,612

[22] Filed: Sep. 15, 1989

[51] Int. Cl.$^5$ .............................................. A01B 1/16
[52] U.S. Cl. .................................... 294/50.7; 294/50
[58] Field of Search .................. 294/50, 50.5, 50.7, 294/60, 61; 30/128, 130; 73/864.44, 864.45; 111/92, 96, 99, 106, 115; 172/19, 21, 22; 175/20, 313; 222/391; 254/132

[56] References Cited

U.S. PATENT DOCUMENTS

| | | |
|---|---|---|
| 287,677 | 10/1883 | Higinbotham et al. |
| 554,139 | 2/1896 | Ober .............................. 294/50.7 X |
| 1,225,188 | 5/1917 | Smith ............................ 294/50.7 X |
| 1,226,980 | 5/1917 | Linse . |
| 1,262,170 | 4/1918 | Bussell . |
| 1,466,168 | 8/1923 | Holton ............................. 294/50.5 |
| 1,539,088 | 5/1925 | Jones . |
| 1,548,865 | 8/1925 | Bull ................................. 294/50.7 X |
| 1,640,732 | 8/1927 | Simpson . |
| 1,692,436 | 11/1928 | Deane ............................. 294/50.5 X |
| 1,783,026 | 11/1930 | Ober . |
| 1,887,796 | 11/1932 | Boere . |
| 2,030,770 | 2/1936 | Smith .............................. 294/50.5 |
| 2,185,552 | 1/1940 | Hecox . |
| 2,531,297 | 11/1950 | Rose ............................... 294/50.7 X |
| 2,532,115 | 11/1950 | McKinney ...................... 254/132 |
| 3,152,788 | 10/1964 | Hardwidge .................... 254/132 |
| 3,163,455 | 12/1964 | Tuggle ........................... 294/50.7 X |
| 3,210,112 | 10/1965 | Glynn ............................. 294/50.7 |
| 3,332,501 | 7/1967 | Parish ............................. 294/50.7 X |
| 3,444,938 | 5/1969 | Ballmann ....................... 294/50.7 X |
| 3,927,720 | 12/1975 | Rauch ............................ 294/50.7 X |
| 4,072,254 | 2/1978 | Cox ................................ 222/391 |
| 4,081,112 | 3/1978 | Chang ............................ 222/391 |
| 4,585,072 | 4/1986 | Martinez ........................ 294/50 X |
| 4,676,538 | 6/1987 | Fiedler ........................... 294/50 |
| 4,715,634 | 12/1987 | Mueller et al. ................. 294/50.5 |
| 4,819,735 | 4/1989 | Puckett .......................... 294/50.7 X |
| 4,822,088 | 4/1989 | Price .............................. 294/50.7 |

FOREIGN PATENT DOCUMENTS

| | | | |
|---|---|---|---|
| 598340 | 1/1931 | Fed. Rep. of Germany | 294/50.5 |
| 526911 | 6/1931 | Fed. Rep. of Germany | 294/50.5 |
| 1459312 | 11/1966 | France | 294/50.7 |
| 127864 | 4/1950 | Sweden | 294/50.7 |
| 638898 | 6/1950 | United Kingdom | 294/50.7 |
| 865902 | 4/1961 | United Kingdom | 294/50.7 |

OTHER PUBLICATIONS

Sunday Star-Ledger, Forked River, N.J., Jun. 18, 1989, "Weed Puller Takes Years to Germinate", by Finston.

*Primary Examiner*—Johnny D. Cherry
*Attorney, Agent, or Firm*—Herbert L. Lerner; Laurence A. Greenberg

[57] ABSTRACT

A weed puller is disclosed having a tubular main body member in one end of which is mounted a piston that is spring-biased toward a released position adjacent the body one end. At its other end, the main body member is provided with a handle arrangement for displacing the piston to a retracted positon within the body member via a piston rod that extends longitudinally through the main body member and projects at its free end therefrom. A drive plate is incrementally displaced by a lever to incrementally displace the rod and the piston toward the retracted position, and a releasable locking plate locks the rod and the piston against return displacement toward the released position.

14 Claims, 1 Drawing Sheet

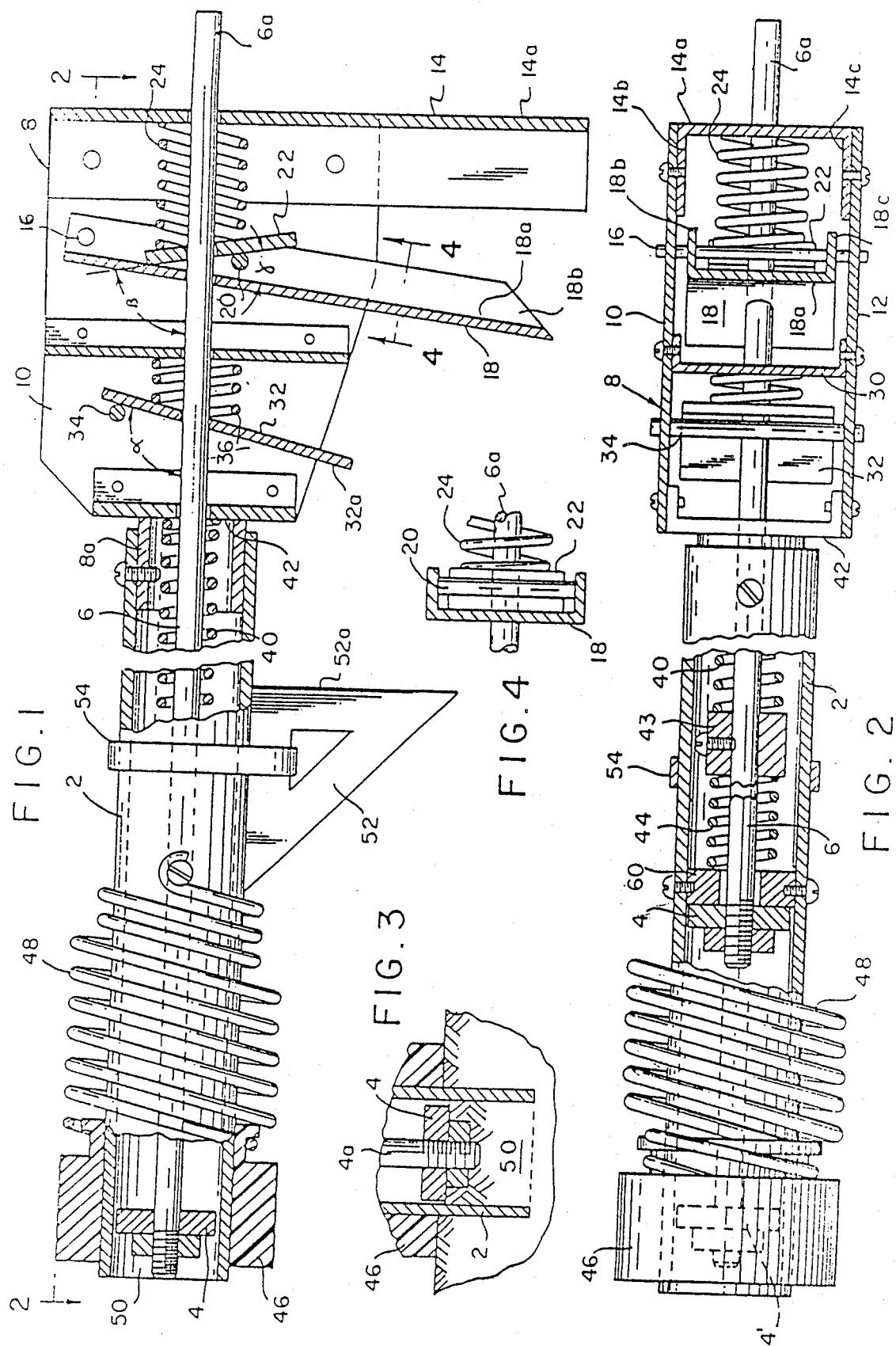

WEED PULLER WITH PLUG EJECTING MEANS

STATEMENT OF THE INVENTION

An improved weed puller is disclosed having improved means for automatically ejecting a weed plug from the end of a tubular main body member, characterized by the provision of a hand grip lever for operating a drive plate to retract incrementally a piston against a main spring toward a retracted position within the body member, and a trigger-operated locking plate for releasing the piston from its retracted position, thereby to automatically eject a weed plug from the tool.

BRIEF DESCRIPTION OF THE PRIOR ART

In my prior U.S. Pat. No. 4,822,088, a weed puller is disclosed having a piston that is operated from a released position to a retracted position within a tubular body member, a latch or pawl being provided for retaining the piston in its retracted position. Upon operation of the latch, the spring-biased piston is returned to its initial position to automatically eject a weed plug from the tool. Similar weed pulling tools are disclosed in the U.S. Pat. Nos. to Martinez 4,585,072, Mueller et al 4,715,634, Puckett 4,819,735, Glynn 3,210,112 and Ballmann 3,444,938, among others.

As evidenced by the U.S. Pat. Nos. to Cox 4,072,254 and Chang 4,081,112, it is also known in the caulking gun art to provide hand grip means including a pivotally operable lever for incrementally displacing a piston or plunger within a cylinder.

The present invention was developed to provide an improved weed puller including simple, relatively inexpensive hand-grip operating means for retracting a piston against the restoring force of a main biasing spring toward a retracted position within a tubular member, together with trigger-operated release means, thereby to obtain a more positive piston-retracting and plug-ejecting operation.

SUMMARY OF THE INVENTION

Accordingly, a primary object of the invention is to provide an improved weed puller in which a gripping lever is pivotally operable to displace a piston rod to incrementally retract a piston toward a retracted position within a tubular main body member, a releasable trigger-operated locking plate serving to retain the piston in the retracted position. Upon operation of the locking plate, the piston is released and returned by the main spring to its initial position adjacent the end of the tubular body member, thereby to automatically eject a weed plug from the tool.

According to a more specific object of the invention, a locking plate is mounted on the piston rod for operation by a pivotal drive lever to incrementally retract the piston within the tubular body member, a locking plate serving to lock the rod against return movement as the drive lever is pivotally returned to its drive position. The drive and locking plates each contain an opening that receives the piston rod, the diameter of the opening being slightly greater than that of the rod. Consequently, when either plate is angularly arranged in a binding position relative to the piston rod, diametrically opposed portions of the plate opening are brought into gripping engagement with the rod periphery. The plates normally have corresponding angles relative to the rod that are obtuse and acute, respectively, whereby the locking plate releasably retains the piston rod against spring-biased return when the pivotally operable drive lever is released.

According to another object, a leaf collar is slidably mounted concentrically upon the said one end of the tubular member, whereby upon the withdrawal of the tool from the ground with the piston still in the retracted position and with a weed plug formed within the tube end, the spring-biased leaf collar is returned to its initial position to automatically remove debris from the exterior surface of the tool.

BRIEF DESCRIPTION OF THE DRAWING

Other objects and advantages of the invention will become apparent from a study of the following specification when viewed in the light of the accompanying drawings, in which:

FIG. 1 is a partly sectional elevational view of the weed pulling apparatus;

FIG. 2 is a partly sectioned top plan view taken along line 2—2 of FIG. 1;

FIG. 3 is a detailed sectional view illustrating the manner in which a weed plug is formed in one end of the main body member; and FIG. 4 is a detailed sectional view taken along line 4—4 of FIG. 1.

DESCRIPTION OF THE PREFERRED EMBODIMENT

Referring first more particularly to FIGS. 1 and 2, the improved weed pulling apparatus includes a tubular main body member 2 in one end of which is slidably mounted a piston 4 having a piston rod 6 that extends longitudinally through the tubular main body member 2 and outwardly beyond the other end thereof. Fastened to the said other end of the main body member 2 by mounting sleeve portion 8a are operating handle means 8 including a housing having a pair of parallel spaced side walls 10 and 12 arranged on opposite sides of and parallel with the rod projecting portion 6a. At its free end, the handle housing 8 is provided with a rigid hand grip portion 14 that extends normal to the rod projecting portion 6a, said hand grip portion having a U-shaped cross-sectional configuration to define a transverse wall portion 14a, and a pair of side wall portions 14b and 14c. The transverse portion 14a contains an opening through which the piston rod projecting portion 6a slidably extends.

Pivotably connected with the handle housing 8 by a transverse pivot rod 16 is a drive lever 18 of U-shaped cross-sectional configuration defining a transverse wall 18a and a pair of side wall portions 18b and 18c, thereby defining a channel that faces the hand grip portion 14. Connected between the side walls 18b and 18c on the opposite side of the piston rod from the pivot shaft 16 is a first support bar 20. Mounted on the piston rod portion 6a is a drive plate 22 having an opening with a diameter that is slightly greater than the diameter of the piston rod. Drive spring 24 mounted concentrically on the projecting rod portion 6a biases the drive plate toward the angularly arranged binding position shown in FIG. 1, whereupon diametrically opposite surfaces of the wall of the opening in the drive plate are in gripping engagement with the peripheral surface of the rod portion 6a, the drive plate being supported on one side of the piston rod by the support bar 20, and on the other side being in engagement with the transverse wall surface 18a of the drive lever 18. Thus, when the drive plate 22 is in its illustrated binding position, it is arranged at the acute angle β to the longitudinal axis of the piston rod.

Connected between the side walls 10 and 12 of the handle housing 8 is an intermediate transverse wall 30. Mounted on the piston rod projecting portion 6a is a locking plate 32 having an opening with a diameter that is slightly greater than that of the piston rod 6. A second transverse support bar 34 is connected between the housing side walls 10 and 12, said locking plate being biased by locking spring 36 toward the illustrated angularly arranged binding position relative to the piston rod 6. In this position, diametrically opposed portions of the wall of the opening contained in plate 32 are in gripping engagement with the peripheral surface of the piston rod 6. When in the illustrated binding position, the locking plate 32 is arranged at the obtuse angle α relative to the longitudinal axis of the piston rod. Helical main spring 40 reacts between the transverse wall 42 of the handle housing and an annular collar 43 secured to shaft 6 to bias piston 4 outwardly toward its illustrated released position of FIG. 1. Light cushion spring 44 is mounted concentrically about shaft 6 between collar 43 and annular stop 60 that is secured within tubular body member 2. Mounted concentrically about the said one end of the main body member 2 is a cylindrical leaf collar 46 that is biased toward its illustrated released position in FIG. 1 by a helical spring 48 that is mounted concentrically about the main body member 2.

The handle means 8 is operable to retract the piston rod from the released position 4' illustrated in phantom in FIG. 2 toward the retracted position illustrated in solid lines in FIG. 2, thereby to define in the said one end of the tubular main body member a chamber 50 for receiving a weed plug when one end of the weed puller is inserted into the ground as shown in FIG. 3. In this regard, a foot ledge member 52 is rigidly connected with the main body member 2 adjacent said one end by means of a hose clamp 54 or the like, thereby to permit the application of force to the tool by the user's foot.

OPERATION

In operation, in order to move the piston 4 from its released position of FIG. 1 toward its retracted position of FIG. 2, the user squeezes the drive lever 18 to pivot the same relative to the hand grip portion 14, thereby to displace the drive plate 22 to the right against the biasing force of spring 24. Since the drive plate 22 is in the angularly arranged binding position, piston rod 6a is displaced to the right to cause piston 4 to be shifted incrementally to the right against the force of main spring 40 toward the retracted position of FIG. 2. Upon release of the drive lever 18, owing to the biasing by spring 24, lever 18 is pivoted in the clockwise direction and drive plate 22 is biased to the left, shifting of the rod 6a and piston 4 to the left being prevented since the locking plate 32 is in its binding position. Upon repeated squeezing and release of the drive lever 18, the piston rod 6 is shifted to the right to displace piston 4 toward its fully retracted position in engagement with fixed collar stop 60, as shown in FIG. 2. The piston 4 is now retained in its fully retracted position owing to the locking cooperation between locking plate 32 in its binding position and the piston rod 6.

The user then arranges one end of the main tubular member 2 over the core portion of a weed to be pulled, whereupon the user presses down on the uppermost surface 52a of the foot ledge, thereby to insert the end of the main body member within the ground as shown in FIG. 3. During this insertion step, the collar member 46 is displaced away from the free end of the main body member against the biasing force of the return spring 48. The user then removes the weed pulling tool from the soil with the weed plug contained within the chamber 50, whereupon the collar 46 is returned back to its illustrated release position owing to the biasing force of return spring 48, thereby removing debris from the outer surface of the main body member.

The weed plug is automatically removed from the chamber 50 by applying pressure to the trigger portion 32a of the locking plate 32, thereby to pivot the locking plate 32 from its binding position toward a release position, whereupon the piston rod is released and the piston is returned to its initial released position by force of the restoring spring 40, the weed plug being simultaneously ejected from the main body member 2.

In order to pull a second weed core from the earth, the drive lever 18 is again repeatedly gripped relative to the stationary hand grip portion 14 to displace piston rod 6a to the right in FIG. 1, thereby to incrementally retract piston 4 toward its retracted position.

Preferably, the piston 6 is formed of a hard metal such as steel, and the main body and housing portions are formed of rigid metal or synthetic plastic materials.

While in accordance with the provisions of the Patent Statutes the preferred form and embodiment of the invention has been illustrated and described, it will be apparent that various changes may be made without deviating from the inventive concepts set forth above.

What is claimed is:
1. A weed pulling apparatus, comprising
    (a) a tubular main body member adapted for insertion at one end into the ground;
    (b) a piston slidably mounted in said body member one end;
    (c) main spring means biasing said piston toward a first position adjacent said body member one end;
    (d) handle means including a housing connected with the other end of said main body member;
    (e) a piston rod arranged longitudinally within said main body member, one end of said piston rod being connected with said piston, the other end of said rod projecting outwardly beyond said main body member and longitudinally within said housing;
    (f) drive means connected with said handle means for cooperation with said rod to drive said piston toward a retracted position within said main body member; and
    (g) releasable locking means connected with said handle means being operable in a locking condition for locking engagement with said rod to lock said piston in said retracted position and being operable in a released condition, whereby when said piston is in the retracted position and said main body member is inserted into the ground to form a weed plug within said main body member one end, operation of said locking means to the released condition permits said piston to be moved by said main spring means toward said first position to automatically eject said weed plug from said body member,
    (h) said drive means and said locking means each including a plate containing a wall opening receiving said piston rod, the wall opening of each plate having a diameter being slightly greater than that of said rod, and

(i) spring means biasing said plates toward angularly arranged binding positions relative to said rod in which diametrically opposed positions of the wall opening of each plate are in binding engagement with said rod, respectively, one of said plates forming an acute angle with said piston rod and the other of said plates forming an obtuse angle with said piston rod in said binding positions.

2. Apparatus as defined in claim 1, wherein said handle means housing includes a stationary hand grip portion, and further wherein said drive means includes a drive lever pivotally connected at one end with said housing and extending at its other end adjacent said hand grip portion, said drive lever including an intermediate portion arranged to engage the associated drive means plate when said drive means plate is in the binding position relative to said rod, whereby upon pivotal movement of said drive lever, said drive means plate and said piston rod are incrementally longitudinally displaced to retract said piston toward said retracted position.

3. Apparatus as defined in claim 2, wherein said locking means plate has a trigger portion that extends from said housing intermediate said drive lever and said main body member.

4. Apparatus as defined in claim 3, wherein said housing includes a pair of parallel side wall plates arranged on opposite sides of and parallel with said piston rod; and further wherein said drive lever has a U-shaped cross-sectional configuration including a pair of arm portions and a transverse portion defining a channel facing said drive means plate, said drive lever including a first transverse support bar connected between said arm portions on the opposite side of said piston rod from said one lever end, and drive spring means biasing said drive means plate into engagement with said lever transverse portion on one side of said piston rod and with said support bar on the opposite side of said piston rod.

5. Apparatus as defined in claim 4, wherein said housing includes a second transverse support bar connected between said housing side wall plates intermediate said locking means plate and said main body member; and further including locking spring means biasing said locking means plate in said binding position against said second support bar.

6. Apparatus as defined in claim 1, wherein said main body member includes laterally projecting foot ledge means adjacent said one end of said main body member, whereby upon the application of force by the user's foot to said foot ledge means, said main body member one end is forced into the ground.

7. Apparatus as defined in claim 1, and further including a debris-removing collar slidably mounted concentrically about said main body member one end, and collar spring means biasing said collar toward a released position adjacent the extremity of said one end, whereby upon removal of said main body member one end from the ground, said collar is displaced toward said released position to remove debris from the exterior surface of said main body member one end.

8. Apparatus as defined in claim 1, and further including an annular stop member mounted concentrically within said tubular body member for abutting engagement by said piston when said piston is in the retracted position.

9. Apparatus as defined in claim 8, and further including an annular collar member mounted on said piston rod between said stop member and said other end of said tubular member, said main spring means being arranged for reaction between said collar member and said tubular member other end.

10. Apparatus as defined in claim 9 and further including a helical compression buffer spring mounted concentrically on said piston rod intermediate said stop member and said collar member.

11. A weed pulling apparatus, comprising
(a) a tubular main body member having one end for insertion into the ground around a weed to form a weed plug and having another end;
(b) a piston rod being longitudinally disposed within said main body member and having two ends;
(c) a piston connected to one of said ends of said piston rod;
(d) piston biasing means for biasing said piston toward the one end of said main body member;
(e) means for driving said piston rod for moving said piston toward the other end of said main body member into a retracted position, said driving means including a drive plate having an opening formed therein receiving said piston rod, and drive plate biasing means for biasing said drive plate toward a first angularly binding position relative to said piston rod;
(f) means for locking said piston rod with said piston in said retracted position, said locking means including a locking plate having an opening formed therein for receiving said piston rod, and locking plate biasing means for biasing said locking plate toward a second angularly binding position relative to said piston rod being different from said first angular binding position; and
(g) means for releasing said piston rod permitting said piston biasing means to move said piston from said retracted position and eject the weed plug from said main body member.

12. Apparatus as defined in claim 11, wherein said driving means include a rigid handle grip portion mounted on said piston rod, and a drive lever gripping said piston rod and being movable toward said rigid handle grip portion for incrementally driving said piston rod and moving said piston into said retracted position, said rigid handle grip portion and said drive lever being spaced apart by a distance permitting one hand of a user to simultaneously grasp said rigid handle grip portion and move said drive lever.

13. Apparatus as defined in claim 11, wherein said locking and drive plates alternately grip said piston rod as said piston rod is being retracted.

14. A weed pulling apparatus, comprising
(a) a tubular main body member having one end for insertion into the ground around a weed to form a weed plug and having another end;
(b) a piston rod being longitudinally disposed within said main body member and having two ends;
(c) a piston connected to one of said ends of said piston rod;
(d) piston biasing means for biasing said piston toward the one end of said main body member;
(e) means for driving said piston rod for moving said piston toward the other end of said main body member into a retracted position, said driving means including a rigid handle grip portion mounted on said piston rod, and a drive lever gripping said piston rod and being movable toward said rigid handle grip portion for incrementally driving said piston rod and moving said piston into said retracted position, said rigid handle grip portion and said drive lever being spaced apart by a distance permitting one hand of a user to simultaneously grasp said rigid handle grip portion and move said drive lever;

(f) means for locking said piston rod with said piston in said retracted position; and
(g) means for releasing said piston rod permitting said piston biasing means to move said piston from said retracted position and eject the weed plug from said main body member.

* * * * *